(12) United States Patent
Duclos et al.

(10) Patent No.: US 10,076,884 B2
(45) Date of Patent: Sep. 18, 2018

(54) END OF ARM TOOLING

(71) Applicant: Magna International Inc., Aurora (CA)

(72) Inventors: Donald Duclos, Innisfill (CA); John Ingram, Richmond Hills (CA); Zongxun Wang, Toronto (CA)

(73) Assignee: Magna International Inc., Aurora (CA)

( * ) Notice: Subject to any disclaimer, the term of this patent is extended or adjusted under 35 U.S.C. 154(b) by 128 days.

(21) Appl. No.: 15/129,669

(22) PCT Filed: Apr. 1, 2015

(86) PCT No.: PCT/IB2015/052413
§ 371 (c)(1),
(2) Date: Sep. 27, 2016

(87) PCT Pub. No.: WO2015/151054
PCT Pub. Date: Oct. 8, 2015

(65) Prior Publication Data
US 2017/0173898 A1   Jun. 22, 2017

Related U.S. Application Data

(60) Provisional application No. 61/974,147, filed on Apr. 2, 2014.

(51) Int. Cl.
*B29C 70/44* (2006.01)
*B29C 31/08* (2006.01)
(Continued)

(52) U.S. Cl.
CPC ........... *B29C 70/44* (2013.01); *B25J 15/0616* (2013.01); *B29C 31/08* (2013.01); *B29K 2105/0872* (2013.01)

(58) Field of Classification Search
CPC . B29C 70/44; B29C 70/38; B29C 2043/3411; B29C 2043/3605; B29C 31/08; B29C 31/085
(Continued)

(56) References Cited

U.S. PATENT DOCUMENTS 4,943,222 A * 7/1990 Nathoo .................... B28B 7/12
264/511
5,427,518 A 6/1995 Morizot et al.
(Continued)

FOREIGN PATENT DOCUMENTS

DE 102011056029 A1 * 6/2013 .......... B25J 15/0616
EP 0250012 A2 * 12/1987 ............... B28B 7/12
(Continued)

OTHER PUBLICATIONS

International Search Report for International Application No. PCT/IB2015/052413, dated Jun. 12, 2005.

*Primary Examiner* — Robert B Davis
(74) *Attorney, Agent, or Firm* — Warn Partners, P.C.

(57) ABSTRACT

End of arm tooling system and a method for manufacture is provided. The end or arm tooling system provides automated material handling, part manipulation, preforming and transferring of a pre-impregnated carbon fiber material. A robot is connected to end of arm tooling for automated material handling and transfer operations from at least a lower preform tool system where light compression is applied to a molding press. The end or arm tooling system includes a cured silicone membrane as well as vacuum and air blow off, allowing for robotically preforming, picking up and dropping-off pre-impregnated carbon fiber materials which are notoriously sticky and difficult to handle.

22 Claims, 4 Drawing Sheets

(51) Int. Cl.
*B25J 15/06* (2006.01)
*B29K 105/08* (2006.01)

(58) Field of Classification Search
USPC .................................................. 425/89, 389
See application file for complete search history.

(56) References Cited

U.S. PATENT DOCUMENTS

| | | | | |
|---|---|---|---|---|
| 5,939,013 A | * | 8/1999 | Han | B29C 70/443 |
| | | | | 264/257 |
| 2009/0044471 A1 | * | 2/2009 | Harlin | B29C 70/30 |
| | | | | 52/309.13 |
| 2010/0320642 A1 | * | 12/2010 | Weimer | B29C 70/342 |
| | | | | 264/258 |
| 2014/0292010 A1 | * | 10/2014 | Graupner | B25J 15/00 |
| | | | | 294/61 |

FOREIGN PATENT DOCUMENTS

| | | | | |
|---|---|---|---|---|
| GB | 2490150 A | * 10/2012 | ............. | B29C 31/08 |
| WO | 2008/133974 A2 | 11/2008 | | |
| WO | 2011/130475 A2 | 10/2011 | | |
| WO | WO-2012055788 A1 | * 5/2012 | ............. | B25J 15/00 |

* cited by examiner

END OF ARM TOOLING

CROSS-REFERENCE TO RELATED APPLICATIONS

This application is a National Stage of International Application No. PCT/IB2015/052413, filed Apr. 1, 2015. This application claims priority to U.S. Provisional Patent Application No. 61/974,147 filed Apr. 2, 2014. The disclosure of the above application is incorporated herein by reference.

FIELD OF THE INVENTION

The present invention relates to a robotic end effector tool used in a manufacturing facility in an automated process in combination with fixed frame tooling for forming and transferring predetermined material.

BACKGROUND OF THE INVENTION

Molding of various polymers and composite materials is a common method used to create parts for various applications. Traditionally, autoclave, out-of-autoclave, or compression molding approaches are used in molding composite materials. Typically, in these processes material/component transport to various stations is largely manual.

Composite materials are moldable in an autoclave process typically through use of a one-sided tool where the material sheet or pre-form is placed over the one-sided tool and then heated in an autoclave under pressure or vacuum that causes the perform to mold into a desired shape. The overall process is very slow and expensive to carry out since the steps of forming the material in an autoclave and using high heat and pressure significantly increases the production time and energy costs for creating the molded part and does not provide process scalability for higher volumes. It is therefore desirable to develop other molding arrangements for high volume production of structural automotive parts, preferably, having a Class A finish, e.g., vehicle hood liner, or any other structural part. Typical out-of-autoclave processing, e.g., where a closed mold is heated under vacuum, does not achieve appreciable results over autoclave processing. The materials are also generally moldable in a compression molding process, however, this is inefficient, increases costs, and does not provide process scalability for higher volume.

In addition, use of pre-impregnated sheets for forming molded parts has been done in the past. The pre-impregnated material used generally has high strength due to the presence of fibers within the pre-impregnated sheet that is used for forming a desired part. Traditionally, pre-impregnated materials are molded in the aforementioned processes. However, material handling of material such as carbon fiber pre-impregnated with epoxy material (could be different fibers such as Kevlar, glass, bassalt, etc. or resins such as vinyl ester, poly ester, PA6, PA66, etc.) is difficult as this material "sticks" to many surfaces due to an affinity to mating contact surface and/or Van Der Waal forces which makes release difficult. It is therefore desirable to develop a tooling/molding system and method for pre-impregnated material and preform material processing.

Accordingly, there exists a need for a method of producing parts and a tooling/molding arrangement for material handling of the material and placement into a compression molding tool for higher volume production of parts. It is also desirable to develop a tooling/molding system and method that automates material handling of the material and places into a compression molding tool. Thus, it is further desirable to fully automate a typically manual process.

SUMMARY OF THE INVENTION

The present invention is directed to an end of arm tooling system and a method for processing pre-impregnated carbon fiber or any other material with a two-sided tool in a compression molding process. This provides process scalability for higher volumes compared to traditional (autoclave, out-of-autoclave) or compression molding approaches (the present invention using two-sided compression tooling with a much higher pressure). The process additionally fully automates a typically manual process. The present invention automates material handling of this material and places the material into a compression molding tool. These features have significant benefits and superior results over traditional molding and manual processes, which, among other things, are less productive.

The carbon fiber pre-impregnated with epoxy material (or any other fibers such as Kevlar, glass, bassalt, etc. or any resins such as vinyl ester, poly ester, polyamide (PA6), polyamide 66 (PA66), etc.) is preformed using light pressure to form the two dimensional (2D) material so that it can fit in a three dimensional (3D) mold. Since the material generally springs back after forming, a robot connected to end of arm tooling or end effector tooling performs material handling and transfer operations.

The end of arm tooling (EOAT) withstands a predetermined amount of pressure during forming. The EOAT also withstands a predetermined temperature. In addition, the EOAT weighs less than the payload of the robot for added stability. The EOAT is integrated from a controls and safety standpoint with at least a material in-feed station, lower preform tooling, robot, robot cage/cell, air/vacuum/electrical services, molding press, and/or other stations/components/parts, etc. Further, features of the present invention retain a silicone membrane having a predetermined thickness and durometer to the EOAT. The combination of a cured silicone membrane with vacuum and air blow off allows robotic pre-forming and pick-up and drop-off of pre-impregnated materials such as carbon fiber materials which are notoriously sticky and difficult to handle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention is directed generally to a tooling/molding system comprising an end of arm tooling and method for pre-impregnated carbon fiber material processing using a two-sided tool in a compression molding process. The method includes automated material handling of this material. A robot is connected to end of arm tooling (or "end effector tooling") for material handling and transfer operations. The end of arm tooling withstands a predetermined amount of light pressure preforming. A combination of cured silicone membrane with vacuum and air blow off allows for robotically pre-forming, picking up and dropping-off pre-impregnated carbon fiber materials which are notoriously sticky and difficult to handle. The present invention also provides picking up and dropping off of pre-impregnated material in either 2D or 3D, which is a significant advantage. The present invention further provides picking up, preforming, transferring, and dropping off pre-impregnated in either 2D or 3D shaped or contoured, which is a significant advantage—especially in high volume carbon fiber processing. Fully automating the tooling/process has significant advantages. Typical systems are ineffective and incapable of automation since tooling lacks the capability to perform necessary steps.

Figure 1:
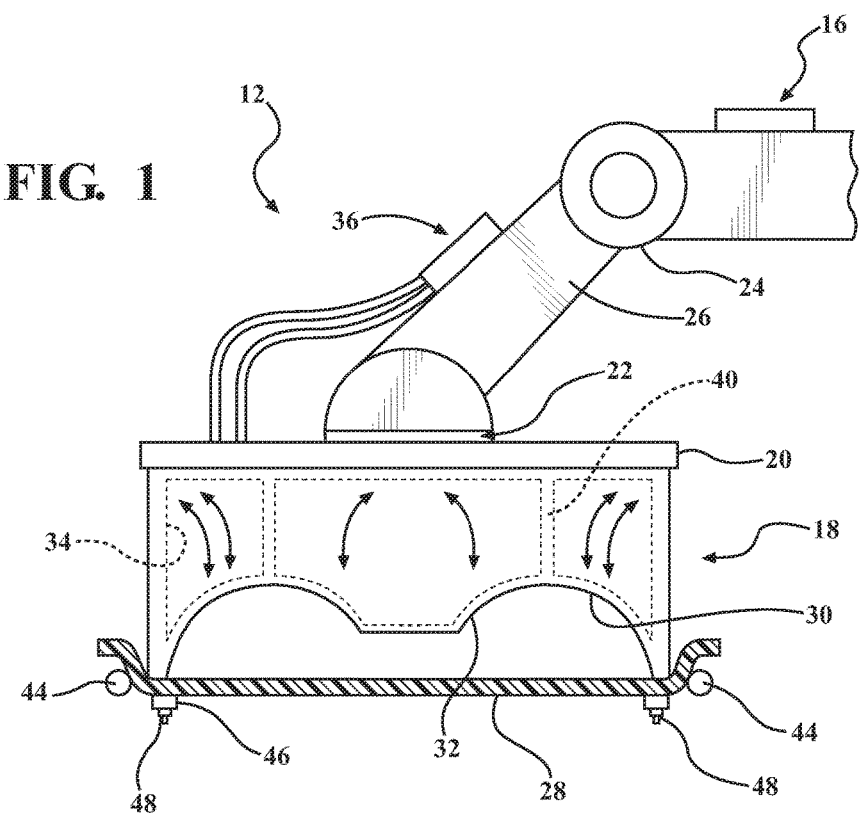
FIG. 1 is a broken-away side view of end of arm tooling connected to a robot, in accordance with an embodiment of the present invention.
Figure 2:
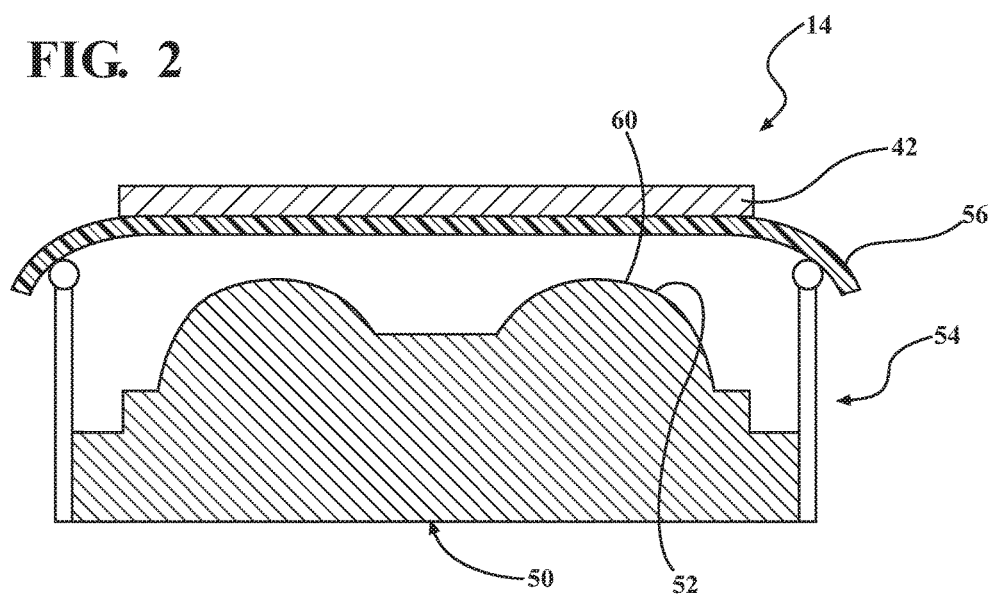
FIG. 2 is a broken-away side view of lower preform tooling, in accordance with the present invention.
Figure 3:
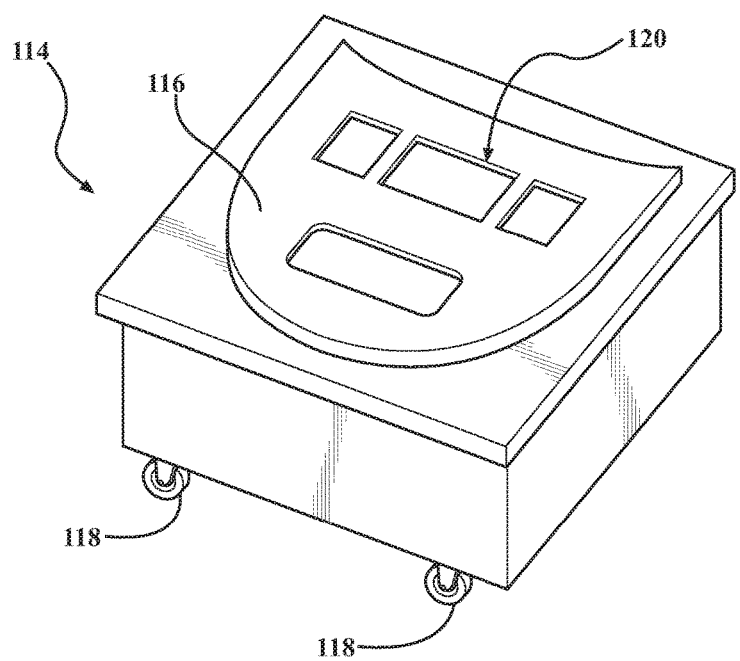
FIG. 3 is a perspective view of lower preform tooling, in accordance with a second embodiment of the present invention.
Figure 4:
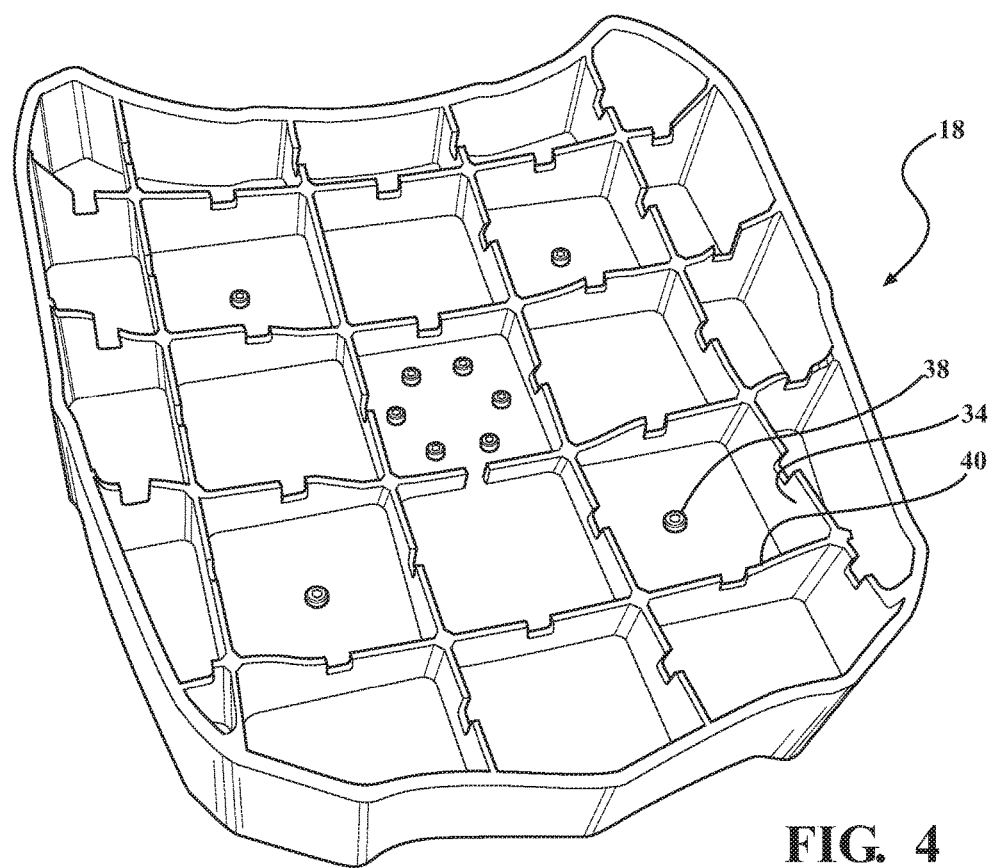
FIG. 4 is a perspective view of interior of a vacuum box of the end of arm tooling, in accordance with any embodiment of the present invention.

Referring to FIGS. 1-7 generally, and more particularly to FIGS. 1-2 and 4, there is generally provided an end of arm tooling system (EOAT) shown generally at 12, in accordance with the present invention. There is also provided a lower preform tool system (or "nest" or "fixture") indicated generally at 14 for use with the EOAT 12. The EOAT 12 is connected to a robot indicated generally at 16 to articulate and move the EOAT 12 to various stations in the manufacturing process, including, into operational engagement with the lower preform tool 14 forming a two-part press apparatus having an upper half or first tool portion (e.g., EOAT 12) and a lower half or second tool portion (e.g., lower preform tool 14).

The EOAT 12 has a vacuum box indicated generally at 18 connected to a vacuum box lid 20 by fasteners, e.g., screws etc, and is sealed with adhesive, sealant and/or caulking. The vacuum box lid 20 closes out the vacuum box 18 to create a closed box environment. The vacuum box lid 20 is also connected to the robot 16. Typically, the lid 20 has a mating/attachment area, preferably, centrally located, connected to a robot coupling shown generally at 22. This robot coupling 22 attaches the end of the robot 16 to the EOAT 12.

The robot coupling 22 is any coupling suitable to connect the EOAT 12 to the robot arm. The area of attachment is fixed and not rotatable.

The robot arm includes at least one pivot joint 24 for rotating the lower half of the robot arm 26 for moving the EOAT 12 into position at the various stations. The robot 16 is also rotatable near the base. An exemplary end of the robot 16 is shown broken along its length to indicate the robot 16 must correlate with manufacturing application requirements and end user specific predetermined requirements. The robot 16 is used to articulate and move the end of the robot with the EOAT 12 to any number of predetermined stations, e.g., to load pre-from into compression molds, etc. Depending on the application the robot 16 has a predetermined axes, payloads, and reach depending on make or model or manufacturing requirements. The robot 16 can provide 3-axis, 6-axis or modified to be additional axis, reach, payloads and combinations thereof or otherwise modified depending on the application.

The EOAT 12 is provided with an upper membrane 28 that is connected to the vacuum box 18. The upper membrane 28 is attached with fasteners 48, e.g., screws etc, and/or a perimeter retaining trim 46 and is sealed with adhesive, sealant and/or caulking. The upper membrane 28 can, alternatively, be attached and/or sealed via a solid frame and/or at periodic attachment points to the vacuum box 18 without deviating from the present invention. Any such frame for the upper membrane 28 is either static or on a movable frame (mounted on cylinders) which allows the frame to move up and down during pressing. The frame can impose and bias tension onto the upper membrane 28 as dictated by application.

The upper membrane 28 is a silicone membrane or sheet that overcomes carbon fiber pre-impregnated material or other material from sticking during pressing. The upper membrane 28 also conforms to a predetermined 3D shape while pressing. The vacuum box 18 is a "hollowed" out chamber which allows air to be forced in or evacuated via vacuum or air blow off. During EOAT approach/pressing/post-pressing, vacuum is drawn through the vacuum box causing the upper membrane 28 to retain its shape during transfer to the next position, e.g., during transfer to the compression molding press.

Most preferably, the upper membrane 28 is a cured silicone membrane or sheet or film, e.g., with Torr Technologies cured silicone membrane. Alternatively, the upper membrane 28 is generally an uncured silicone in a variety of thicknesses, sheet widths, durometers, modulus depending on application, typically, a polytetrafluoroethylene sheet. The sheet can be "reusable vacuum bagging" material or "vacuum bagging" Polytetrafluoroethylene or similar film. The combination of cured silicone membrane 28 with vacuum and air blow off facilitates to robotically preform, pick-up and drop-off pre-impregnated carbon fiber materials which are notoriously sticky and difficult to handle.

Optionally, there is provided an upper coating 30 on a profiled surface 32 or contact surface, in accordance with another embodiment of the present invention. Instead of the upper membrane 28, the upper membrane 28 is replacable with the upper coating 30, typically, a sprayed or poured material to prevent carbon fiber pre-preg or other material from sticking. The upper membrane 28 is thereby eliminated. The vacuum box 18 still draws vacuum or provides blow-off as with the upper membrane 28. The upper coating 30 is a cured silicone, nickel teflon, teflon, or other suitable material depending on the application. Thus, the vacuum box 18 has at least one non-stick portion; the upper membrane 28 or the upper coating 30.

The vacuum box 18 generally comprises at least one chamber 34, most preferably, a plurality of interconnected chambers, which allows air to be forced in or evacuated via vacuum or air blow off via supplied devices indicated generally at 36, e.g., air, electrical, vacuum, controls, etc, suitably tailored for particular predetermined manufacturing requirements depending on the application. The vacuum and air blow-off are required. Air is supplied to either a vacuum generator or a vacuum drawn from a remote vacuum tank. Air is also supplied to a switchover valve which transitions air supply from vacuum to blow-off. However, air can be supplied independently for either vacuum or blow-off functions to perform without deviating from the present invention. Vacuum and/or blow-off ports 38 (FIG. 4) are provided though at least one chamber 34 of the vacuum box 18 adapted for connection to at least one conduit. Electrically or hydraulically actuated valves can also be used. Sensors and control elements for error-proofing, part presence, etc. and equipment integration as "hands-off" signals between EOAT 12/robot 16/press are contemplated in accordance with the present invention.

The vacuum box 18 is generally stiff enough to allow for light pressing, e.g., 50-250 psi. Preferably, the vacuum box 18 is reinforced with framing or bracing, e.g., side walls 40, to ensure the box is strong enough to be used for pressing. Most preferably, each chamber 34 is formed of four side walls 40. The vacuum box 18 has a 3D contour shape, indicated by contact surface 32, to the mating surface with the membrane/raw material 42. Alternatively, the vacuum box 18 is flat to the mating surface with the membrane/raw material 42.

The vacuum box lid 20 closes out the vacuum box 18 to create a closed box environment. The vacuum box 18 under vacuum (e.g., indicated by arrows in FIG. 1) with or without pressing draws the upper membrane 28 towards the contoured contact surface 32, and the vacuum keeps the upper membrane 28 in "shape" along with the carbon fiber pre-Impregnated sheet(s) in the 3D sheet being achieved. The vacuum is fully applied directly to the upper membrane 28 or to the upper membrane 28 and the carbon fiber pre-impregnated sheet(s) via operable cut-outs in the upper membrane 28. The vacuum is released (e.g., indicated by arrows) to allow the upper membrane 28 to return to a generally flat state and "roll" or "push" off the 3D formed carbon fiber pre-impregnated Sheet(s) onto the next position, e.g., onto the lower mold half. Optionally, blow-off is used after vacuum is released to help speed up the upper membrane 28 in returning to its generally flat state and/or to have the upper membrane 28 "balloon" outward to assist release of the carbon fiber pre-Impregnated sheet(s).

The vacuum box 18 and vacuum box lid 20 are formed of aluminum, composite (e.g., epoxy/VE/polyethylene or glass/carbon etc., tooling board (e.g., foam), wood, Delrin, nylon, etc, combinations thereof and/or other suitable material dependent upon the application. The vacuum box 18 and vacuum box lid 20 can be machined, cast, poured, layup/autoclaved, resin transfer molding or vacuum assisted resin transfer molding, etc or any other suitable fabrication/mold depending on the application.

Optionally, the EOAT 12 is provided with external clamping. Depending on the application, if the robot 16 cannot provide sufficient predetermined pressure on its own during light pressing, at least two external toggle clamping cylinders 44, or other suitable clamping devices depending on the application, are used to provide additional pressure to the vacuum box 18 without stressing the robot 16 features. The external toggle clamping cylinders are located adjacent to the upper membrane 28, preferably, operably coupled to the bottom corners of the vacuum box fixture and depending in a generally downward direction.

The lower preform tool system 14 is provided with a lower preform tool portion indicated generally at 50 having a second or profiled or contact surface 52 to provide shape or contour of the "B-Side" or lower half of the apparatus. The lower preform tool 50 also provides enough stiffness to accept predetermined light pressure pressing either from the EOAT 12/robot 16 or a press. The lower preform tool 50 is provided with or without through-holes to release vacuum/seal created after pressing. The light pressing pressure is typically at least as low as about 50-250 psi.

The lower preform 14 is provided with a lower membrane attachment frame shown generally at 54 for connecting a lower membrane (or "film") 56. The lower membrane 56 is held fixed via a solid frame and/or at periodic attachment points to the lower membrane attachment frame 54 depending on the application. Any such frame for the lower membrane 56 is either static or on a movable frame (mounted on cylinders) which allows the frame to move up and down during pressing. The frame can impose and bias tension onto the lower membrane 56 as dictated by the particular application. The frame 54 is formed of square tubing, custom machines frame or some other suitable attachment dependent upon the application.

The uncured carbon fiber pre-impregnated sheet(s) 42 are placed on top of the lower membrane 56 in a 2D state, e.g., e.g., placed manually by an operator. The lower membrane 56 is a silicone membrane or sheet that overcomes carbon fiber pre-impregnated material or other material from sticking during pressing and pick-up. The lower membrane 56/material also conforms to a predetermined 3D shape while pressing.

Most preferably, the lower membrane 56 is a cured silicone membrane or sheet or film. Alternatively, the lower membrane 56 is generally an uncured silicone in a variety of thicknesses, sheet widths, durometers, modulus depending on application, typically, a polytetrafluoroethylene sheet. The sheet can be "reusable vacuum bagging" material or "vacuum bagging" Polytetrafluoroethylene or similar film.

The combination of cured silicone membrane 56 with vacuum and air blow off of the EOAT 12 facilitates to robotically preform, pick-up and drop-off pre-impregnated carbon fiber materials which are notoriously sticky and difficult to handle. When the EOAT 12 vacuum is on, the lower membrane 56 allows the upper half of the robot 16 with the attached EOAT 12 to take the carbon fiber pre-impregnated material (or other material) from the lower preform tool 14 after pressing for transferring to the next position/station, e.g., transport to a compression molding press. This is facilitated by the lower preform tool 14 because the material does not stick and the lower membrane 56 allows the pre-preg material to "roll off" as the membrane 56 returns to its generally flat state.

Optionally, there is provided a lower coating 58 on the second contact surface 52, in accordance with another embodiment of the present invention. Instead of the lower membrane 56, the lower membrane 56 is replaced with the lower coating 60, typically, a semi-permanent or permanent coating which prevents the carbon fiber pre-impregnated material from sticking, preferably, applied directly to the second contact surface 52. The lower membrane 56 is thereby eliminated. Most preferably, the lower coating 58 is a spray-on material. Thus, the frame 54 has at least one second non-stick portion; the lower membrane 56 or the lower coating 60.

Referring generally to FIG. 2, an exemplary Uncured 2D Carbon Fiber Pre-Impregnated ("Pre-Preg") Single Sheet (or "Layer" or "Ply") or Cross-Plied Stack (multiple "Sheets" or "Plies" or "Layers"), is shown generally at 42. These may be square or rectangular carbon fiber sheet(s) pre-impregnated with epoxy, can be stacked in multiple layers of varying orientations (ex. [0], [0190]n, [0/90]s, [0/90/0]s, etc.), can be unidirectional or fabric materials, can be reinforced for local thickening, can have slices, splices, darts, overlaps, etc., can have multiple types of materials (UD and/or fabric and/or random fiber), can have different reactivity levels (slow cure, fast cure, etc.), can have different tack levels (or how sticky it is), can have different Tg's at a variety of ambient conditions, can be warm (20-70 deg C.) or cold (0-20 deg C.) material, and/or can have different degrees of drapability or ability to conform to geometry. Resin Alternatives: epoxy, vinyl ester, polyester, PA66, PA6. Fibers: Carbon fiber, glass fiber, Kevlar, bassalt, metal fibers, etc. Fabric/UD/Chopped: Pre-pregs come in different formats. UD or undirectional (sometimes called "Tape") where all fibers are in one direction. "Chopped" or randomly dispersed fibers (sometimes called "random mat" or "SMC" or "CSM". In addition, fabrics can be impregnated, have different weave formats such 5-Harness, Twill, etc in the above fiber/resin combinations. The sheets 42 can be a single sheet, multiple sheets, have same or varying orientations of fiber directions, and/or be mixed UD and fabric. Depending on the application any other material/composition/dimensions and/or combinations are contemplated without departing from the scope of the invention.

Referring to FIG. 3 generally, in accordance with another embodiment of the present invention, a lower preform tooling system 114 is generally shown at 114 similar to the lower preform tooling 14, however, the system 114 comprises a template indicated generally at 120. A lower membrane 116 that is formed of a cured silicon is provided. The template provided on the membrane 116 provides guidelines for where to place the uncured material 42. The operators are assisted by the templates, most preferably, visual laser templates, e.g., via Virtek/Gerber laser system. Since the cycle time generally exceeds molding cycle, e.g., compression molding, multiple lower preform 114 are required in a preferred embodiment. In addition, lower preform 114 is mobile, most preferably, by a plurality of casters 118 connected to the lower membrane attachment frame 54 to move the lower preform 114 with the uncured material 42 to the EOAT 12 pick-up point (e.g., see FIG. 7).

Alternatively, the surface 116 is operably coated with cured silicone of 65 Shore A durometer. Typically, the tool surface is removable/replacable. Preferably, the tool orientation is cavity side up, e.g., A-side surface facing upwards. Depending on the application, the tooling material is composite (renboard) on an aluminum base on a mobile cart, etc.

Figure 5A:
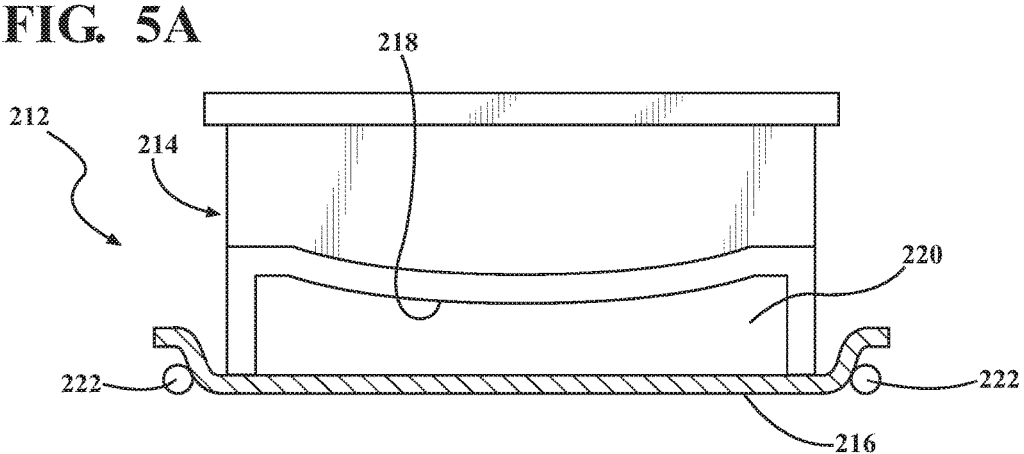
FIG. 5A is a side elevation view of end of arm tooling with vacuum off, in accordance with another embodiment of the present invention.
Figure 5B:
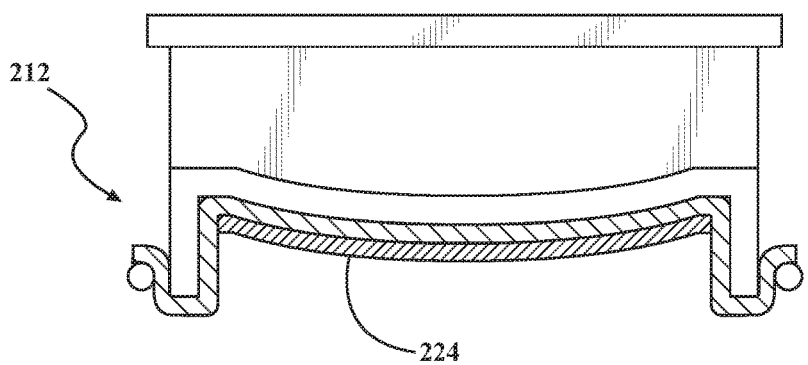
FIG. 5B is a side elevation view of the end of arm tooling of FIG. 5A with the vacuum on, in accordance with the present invention.

Referring to FIGS. 5A and 5B generally, in accordance with another embodiment of the present invention, an end of arm tooling system generally shown at 212 is substantially identical to the first embodiment except that the contact surface 218 has a different profile. The robot 16 is omitted for clarity. The robotic arm is adapted to manipulate the EOAT into position wherein the EOAT presses and then picks up the pre-form minus reinforcing patches for transport to the next station/position. The EOAT generally is 1:1 shape (1:1 surface profile of cavity surface). Typically, there is provided a 1:1 profile with material offset. The vacuum box indicated generally at 214 is, by way of non-limiting example, machined shell from aluminum or renboard braced with an aluminum skeleton. The upper membrane 216 is stretched across and connected to the vacuum box 214.

Most preferably, the contact surface 218 is an A-side cavity surface profile. When the vacuum is off (FIG. 5A), a void 220 is located between the upper membrane 216 and contact surface 218. When the vacuum is on with a material held in place, the EOAT engages the lower preform tooling system, e.g., 114 shown in FIG. 3. The EOAT 12 applies predetermined light compression via the robot 16 or external clamping cylinders 222 (e.g., 0.05 tons/sq in) to preform into a final shape, thereby providing a main preform 224 pressed into shape. The vacuum ensures the upper membrane 216 goes into tension against the contact surface 218 and retains the part. Retaining the main preform part 224 allows the EOAT 12 to move the preform to the next position/station, e.g., including, to a reinforcing patch station.

Figure 6:
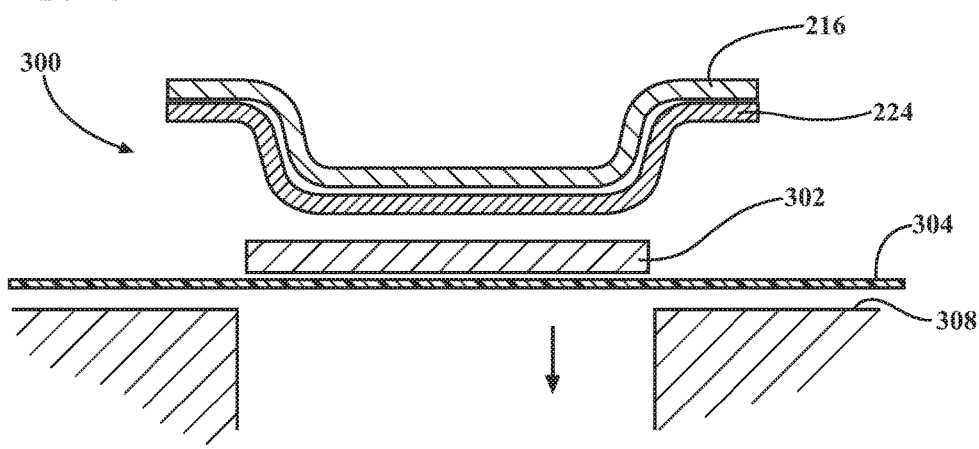
FIG. 6 is a side elevation view of an upper membrane of end of arm tooling adjacent to a main pre-form part and a reinforcement patch for the pre-form adjacent to another membrane of a patch station device, in accordance with the present invention.
Figure 7:
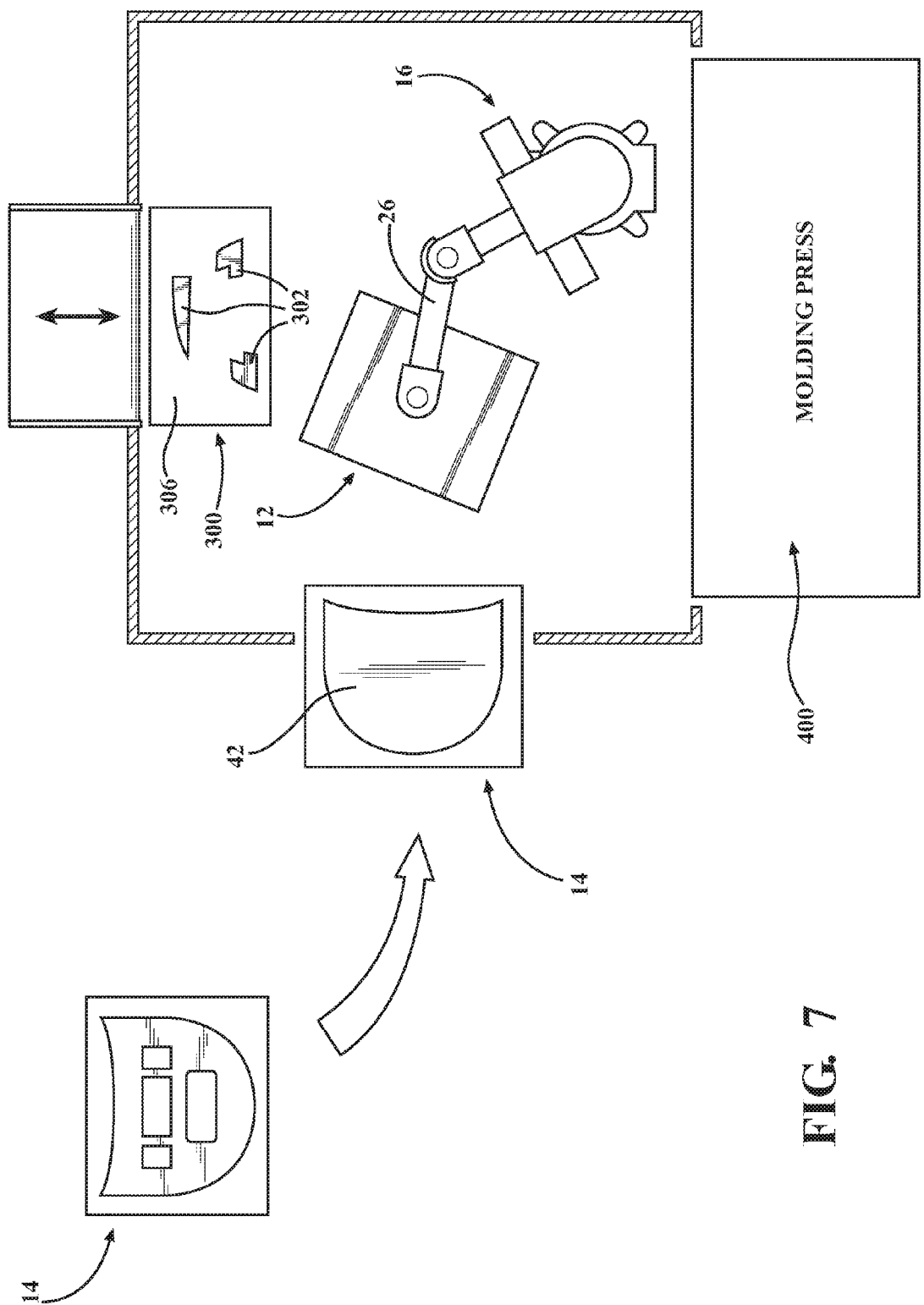
FIG. 7 is a schematic of an exemplary pre-form forming system and illustrating a method for manufacturing a molded part, in accordance with the present invention.

Referring to the figures generally, and in particular to FIGS. 6-7, there is provided a reinforcement patch system indicated generally at 300 adapted to allow the main preform 224 etc held against the upper membrane 28, 216 (shown in FIG. 6) by the EOAT 12, 212 to touch down on at least one reinforcing patch 302, preferably, a plurality of patches 302 simultaneously, and allow the reinforcing patches 302 to adhere to the main pre-form. FIG. 6 also shows the contact direction as indicted by the arrow.

The reinforcing patches 302 are provided pre-cut, most preferably, pre-cut 2D shapes cross-plied to [0,90,90,0]. The reinforcing patches 302 are first loaded, e.g., manually, to nominal positions according to second templates provided on an upward surface 306, most preferably, provided on a third membrane 304 of the tooling system 300. Preferably, the third membrane 304 is a silicon membrane, most preferably, a cured silicone membrane operably connected to a top surface of a fixture 308. The reinforcement patches 302 generally also have tacky material. The system 300 is then operably indexed to the patch pick-up station.

The robot 16 rotates or otherwise moves to bring the EOAT 12, 212 into alignment with the reinforcement patches 302 on the system 300 and touches the main preform 224 down on the reinforcement patches 302. This relies on tackiness of the material to stick to the B-side surface of the main pre-form 224. The reinforcement patches 302 are thereby adhered to the B-side/inside surface of the main pre-form 224.

After the patches 302 are adhered, the robot 16 is rotates or otherwise moves to bring the EOAT 12, 212 into alignment with a lower mold portion of a molding press indicated generally at 400 in FIG. 7. The EOAT 12, 212 vacuum is released to allow the upper membrane 28, 216 to return to a generally flat state and "roll" or "push" off the pre-form part with the reinforcement patches into the lower mold of the molding press 400. Optionally, blow-off is used after vacuum is released to help speed up the upper membrane 28, 216 in returning to its generally flat state and/or to have the upper membrane 28, 216 "balloon" outward and/or create a "trampoline effect" to assist release of the part into the mold, e.g., compression mold or molding press depending on the application.

Referring to all the figures generally the method of manufacturing parts includes first providing predetermined cross-plied material or any other material depending on the application. Cross-plied is formed, e.g., manually, on each lower pre-form tool system 14, 114 on the cured silicon membrane 56, 116 with the B-side/inside surface facing upwards. Preferably, uncured carbon fiber pre-impregnated sheet(s) 42 are placed on top of the lower membrane 56, 116 in a 2D state. Providing multiple systems 14, 114 is preferred and advantageous since cycle time at this lay-down station, e.g., manual lay-down, exceeds the molding cycle.

Depending on the application, once loosely formed on the lower pre-form tool system 14, 114 slits are made to predetermined UD material in strategic areas to allow material to drape/form. If manually introduced slits, the operator is preferably assisted by visual laser templates via a predetermined laser system. Optionally, at least one layer of predetermined twill material is applied to required areas, e.g., predetermined areas facing an engine compartment when in-car position.

Each lower pre-form tool system 14, 114 is preferably mobile, and is cycled with the loosely formed sheets 42 to a main pre-form robot pick-up station within reach of the robot 16/EOAT system 12, 212. The robot 16 rotates or otherwise moves or manipulates the EOAT 12, 212 into position to engage the lower pre-form tool system 14, 114 and apply light compression as set forth previously. The vacuum is turned on to bring the upper membrane 56, 216 into tension against the A-side cavity surface profile, contact surface 32, 218 and retain the pre-form part 224.

In the mean time, reinforcing patches 302 have been loaded, e.g., manually, to nominal positions according to templates provided on the reinforcement patch system 300 as set forth previously and indexed to the patch pick-up station in reach of the robot 16/EOAT 12, 212. The robot 16 rotates or otherwise moves or manipulates the EOAT 12, 212 from the pre-form robot pick-up station into position to engage the reinforcement patch system 300. The pre-form held by the EOAT 12, 212 under vacuum touches down or otherwise comes into contact with the reinforcement patches 302, which patches 302 become adhered to the B-side/inside surface of the pre-form part.

The robot 16 then rotates or otherwise moves or manipulates the EOAT 12, 212 from the reinforcement patch system 300 to the molding press 400. The vacuum is released and the pre-form part releases into the mold as set forth previously.

In general, other processes not limited to molding and other suitable materials are contemplated for manufacturing of parts with automation without deviating from the scope of the present invention. A variety of processes are contemplated, not limited to molding. The parts manufactured can be smaller or larger. Flat sheets of material, single or stacked in multiple orientations are contemplated. Flat sheets of material, generally flat for material handling, single or stacked in multiple orientations. Flat sheets can be pressed into a 3D shape or contoured. Sheets of material can also be solid, spliced, have localized thickened areas (e.g., extra patches of materials). Material can be unidirectional or tape, fabric or random fiber materials.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. End of arm tooling system for transporting a part during manufacturing, comprising:
    a vacuum box having a non-stick portion and at least one contact surface, said vacuum box connected to a robot to manipulate the end of arm tooling system;
    a vacuum lid connected to the vacuum box creating a closed box environment;
    a vacuum and/or air blow off device for selectively picking up and dropping off said part;
    a lower preform tooling system having a lower membrane attachment frame having a second portion and a lower preform tool, said part received on the lower membrane attachment frame; and
    at least one second contact surface formed on the lower preform tool and having a complementary profile to the contact surface of the vacuum box.

2. The end of arm tooling system of claim 1, further comprising an upper membrane connected to the vacuum box, said upper membrane providing the non-stick portion.

3. The end of arm tooling system of claim 2, wherein the upper membrane is a cured silicone membrane.

4. The end of arm tooling system of claim 2, wherein each contact surface has a predetermined profile and the upper membrane presses against each contact surface when the vacuum device is turned on and the part is retained against the upper membrane.

5. The end of arm tooling system of claim 2, wherein when the vacuum is released and the blow-off device is engaged the upper membrane returns to a flat state and/or balloons outward to assist release of the part from the end of arm tooling system.

6. The end of arm tooling system of claim 1, wherein when the vacuum device is turned off the end of arm tooling releases the part.

7. The end of arm tooling system of claim 1, further comprising an upper coating provided on the at least one contact surface, said upper coating providing the non-stick portion.

8. The end of arm tooling system of claim 7, wherein the upper coating is a coating material selected from the group consisting of cured silicone, nickel teflon, and teflon.

9. The end of arm tooling system of claim 7, wherein each contact surface has a predetermined profile and when the vacuum device is turned on the part is pressed against the contact surface and retained in the end of arm tooling assembly.

10. The end of arm tooling system of claim 1, wherein the part is a pre-impregnated material part and/or a main pre-formed part.

11. The end of arm tooling system of claim 1, wherein the part is a fiber pre-impregnated with resin material, wherein the fiber is selected from the group consisting of carbon, kevlar, glass, bassalt, and/or metal, and wherein the resin is selected from the group consisting of epoxy, vinyl ester, polyester, and/or polyamide.

12. The end of arm tooling system of claim 1, wherein the part is a carbon fiber pre-impregnated with epoxy material.

13. The end of arm tooling system of claim 1, wherein the second portion is a lower membrane that is a cured silicone membrane.

14. The end of arm tooling system of claim 1, wherein the end of arm tooling system engages the lower preform tooling system with the vacuum on and applies predetermined amount of pressure to pre-form the part into a predetermined shape.

15. The end of arm tooling system of claim 14, further comprising a plurality of external clamping devices operably connected to the vacuum box, wherein the predetermined amount of pressure is applied via the robot and/or the external clamping devices.

16. The end of arm tooling system of claim 14, wherein pre-forming of the part is preformed using light pressure to form the two dimensional material part so that the part can fit in a three dimensional mold, and said robot connected to the vacuum box performs predetermined material handling and transfer operations.

17. The end of arm tooling system of claim 14, further comprising a reinforcement patch tooling system, comprising:
 a fixture provided with a third membrane and a second template, where the third membrane is a cured silicone membrane and the second template allows for at least one reinforcement patch including a tacky material to be loaded to each nominal position according to the second template; and
 wherein said end of arm tooling system with the vacuum on touches down on the reinforcement patch and the reinforcement patch adheres to the pre-formed part.

18. End of arm tooling apparatus for material handling a sticky part during manufacturing, comprising:
 a vacuum box having an upper membrane that is silicone and at least one contact surface, said vacuum box connected to a robot to manipulate the end of arm tooling system;
 a vacuum lid connected to the vacuum box creating a closed box environment; and
 a vacuum and/or air blow-off device for selectively picking up and dropping off said part, wherein when the vacuum device is turned on the part is pressed against the upper membrane which is pressed against the at least one contact surface, and when the vacuum device is turned off the end of arm tooling releases the part;
 wherein the upper membrane and vacuum and/or air blow-off device overcome the stickiness of the part for material handling between various manufacturing stations;
 a lower preform tooling system, comprising a lower membrane attachment frame having a lower membrane and a lower preform tool; and
 at least one second contact surface formed on the lower preform tool and having a complementary profile to the contact surface of the vacuum box, wherein the vacuum box engaging the lower preform tooling system with the vacuum on and applying predetermined amount of pressure pre-forms the part into a predetermined shape.

19. The end of arm tooling apparatus of claim 18, wherein when the vacuum is turned off and the blow-off is turned on the upper membrane balloons outward and the part is released from the end of arm tooling system.

20. A method for manufacturing parts formed of sticky and difficult to handle material, comprising the steps of:
 providing an end of arm tooling system, said end of arm tooling system comprising a vacuum box having a non-stick portion and at least one contact surface, said vacuum box connected to a robot to manipulate the end of arm tooling system; a vacuum lid connected to the vacuum box creating a closed box environment; and a vacuum and/or air blow off device for selectively picking up and dropping off said part;
 providing a lower preform tooling system; said lower preform tooling system comprising a lower membrane attachment frame having a second non-stick portion and a lower preform tool, said sticky and difficult to handle part received on the lower membrane attachment frame; and at least one second contact surface formed on the lower preform tool and having a complementary profile to the contact surface of the vacuum box;
 providing a reinforcement patch system for selectively holding a plurality of reinforcement patches based on a template provided on a third membrane attached to a fixture;
 providing a molding press;
 rotating the robot into position until the end of arm tooling system engages the lower preform tooling system having the part;
 applying a predetermined light compression via the robot to pre-form the part into a predetermined shape;
 turning the vacuum on to ensure the pre-formed part goes into tension against the at least one contact surface and retains the pre-formed part;
 rotating the robot into position relative to the reinforcement patch system until the pre-formed part retained by the end of arm tooling system touches the plurality of reinforcement patches and are adhere to the pre-formed part;
 rotating the robot into alignment with the molding press;
 turning the vacuum off releasing the pre-formed part with the reinforcement patches into the molding press.

21. The method of claim 20, further comprising providing an upper membrane connected to the vacuum box, said upper membrane providing the non-stick portion, wherein when the vacuum is turned off, the upper membrane returns to a flat state and roll or push off the pre-formed part with the reinforcement patches into the molding press.

22. The method of claim 21, wherein the air blow off device is turned on after vacuum is released to speed up the upper membrane in returning to its flat state and/or to have the upper membrane balloon outward to assist release of the part into the molding press.

* * * * *